W. P. MITCHELL.
Sewing Machine Guide.
No. 28,889.  Patented June 26, 1860.
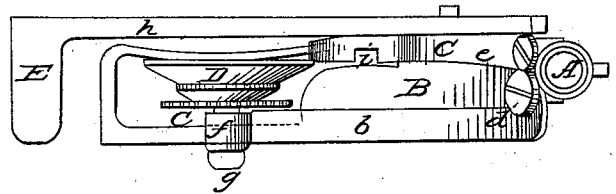
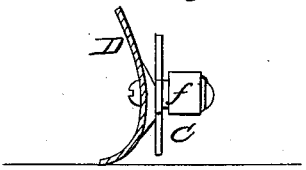
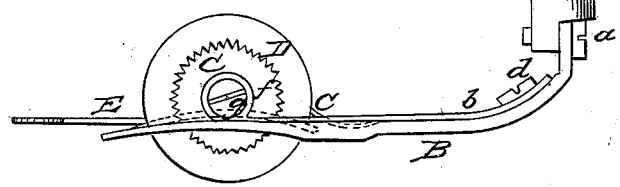
Inventor:
Wm P. Mitchell
By Attorney J. B. Woodruff

UNITED STATES PATENT OFFICE.

WILLIAM P. MITCHELL, OF BALTIMORE, MARYLAND.

IMPROVEMENT IN HEMMING ATTACHMENTS FOR SEWING-MACHINES.

Specification forming part of Letters Patent No. 28,889, dated June 26, 1860.

*To all whom it may concern:*

Be it known that I, WILLIAM P. MITCHELL, of the city and county of Baltimore, in the State of Maryland, have invented new and useful mechanism and fixtures to be applied to sewing-machines for the purpose of turning in and holding hems to be stitched, and also for felling down seams in garments; and the following is a clear and exact description of the same, reference being had to the accompany drawings, making a part of this specification, in which—

Figure 1 represents a side elevation having the stem of cloth-holder attached. Fig. 2 shows a top view of presser-foot, with hemming and felling mechanism. Fig. 3 shows an edge view of the toothed and tucking wheel.

The nature of my invention consists in the construction of the cloth-holder and the mechanical devices thereto attached, so arranged as to turn over evenly and hold in position to be stitched near the edge so turned in any textile fabric, thereby forming what is called the "hem." The same mechanism also answers the purpose of securing the raw edges of seams, and is usually termed "felling down."

To enable others skilled in the art to make and use my invention, I will proceed to describe it, referring to the drawings and the letters marked thereon.

As seen in Fig. 1, A shows the perpendicular stem or sliding rod, to which the cloth-holder or spring presser-foot is secured to sewing-machines, to the bottom end of which is secured by a screw, $a$, the pad or plate B, which is the presser-foot to hold the material to the action of the feeding mechanism. On the upper side of the plate B are two yielding springs, $b$ and $c$, which are secured to it by screws $d$ and $e$ near the stem. On the movable end of the spring $d$ is a boss or hub, $f$, to which is attached an arbor, $g$, having a toothed wheel, C, made of steel or other hard metal, and also an elastic or yielding wheel of larger diameter, D, made of vulcanized rubber or leather, or of any suitable substance that will allow it to bend and assume a conical shape, which tucks the edge of the material under in the process of hemming and felling.

The spring $c$ is made light and yielding, and is so placed on the piece B as to form the stripper for the needle, it having a notch, $i$, in the edge, through which the needle of the machine passes, and is slightly curved up to allow thick seams and irregularities to pass under freely, while it smoothes down the hem or fell.

The pad or foot - piece B is made with an opening through for the wheels C and D, and extends beyond the hub $f$, and is continued around and back of the yielding wheel D, it forming a spring, $h$, being curved at the end downward, and passing slightly beyond and underneath the end of the spring $c$, and is a most essential feature in combination with the conical yielding wheel in turning a hem.

The spring $h$ may be made of a separate piece and screwed to the plate B, and allowed to move up or down to conform to various thicknesses of fabric, if desired.

To the rear side of the plate B, and near the stem A, is secured the conducting-piece or guide $e$, which performs the function of keeping the fabric in a line, so as to make the fold of uniform width as it is drawn in and tucked under by the yielding conical wheel D, which derives its rotating motion and power by the toothed wheel $c$ coming in contact with the top surface of the material as it is moved along by the sewing-machine-feed mechanism.

To operate, I place the fabric to be hemmed under the broad part of the guide E and left-hand end of the pad B. Then by turning the raw edge over the curved part of the pad that extends around the wheels C and D and forms the spring $h$, the fabric is brought in contact with the yielding conical wheel D, which, by its tendency to push outward, turns the edge under the spring $h$, and the fabric is passed along, the folded part being brought under the slight spring $c$. The single thickness passes under the pad B, the whole being moved along to the action of the needle by the sewing-machine feed, thereby forming a continuous fold of equal width. The most important function of the yielding wheel D is that, it being of larger diameter than the toothed wheel $c$, the action and tendency are to keep the edge from gathering or puckering, as is the case with some guides for folding where no roller is used. The process of felling down a seam is to spread the garment flat upon the table of the machine, having the raw edges up, bringing them to the action of the wheel D and spring $h$, and the operation is performed the same as the hemming before described.

Having thus fully described my invention and its operation, what I claim as new, and desire to secure by Letters Patent, is—

The arrangement and combination herein described of the toothed wheel C, and the non-metallic concave wheel D, of larger diameter, formed of india-rubber, leather, or other equivalent flexible material, both wheels being attached to and revolving on the same axis, $g$, as and for the purposes herein set forth.

WM. P. MITCHELL.

Dated New York, March 5, 1860.

Witnesses:
 JOHN S. AMES,
 JAMES C. BARRETT.